United States Patent
Blume

(10) Patent No.: US 8,837,429 B2
(45) Date of Patent: Sep. 16, 2014

(54) METHOD FOR HANDOVER OF A MOBILE NODE IN A COMMUNICATIONS NETWORK

(75) Inventor: Oliver Blume, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 552 days.

(21) Appl. No.: 13/143,427

(22) PCT Filed: Jan. 7, 2010

(86) PCT No.: PCT/EP2010/000057
§ 371 (c)(1),
(2), (4) Date: Oct. 24, 2011

(87) PCT Pub. No.: WO2010/079139
PCT Pub. Date: Jul. 15, 2010

(65) Prior Publication Data
US 2012/0039300 A1 Feb. 16, 2012

(30) Foreign Application Priority Data

Jan. 9, 2009 (EP) .................................. 09290017
Jul. 8, 2009 (EP) .................................. 09290551

(51) Int. Cl.
*H04W 4/00* (2009.01)
*H04W 36/00* (2009.01)
*H04W 60/00* (2009.01)
*H04W 36/02* (2009.01)
*H04W 80/04* (2009.01)

(52) U.S. Cl.
CPC .......... *H04W 36/0016* (2013.01); *H04W 60/00* (2013.01); *H04W 36/02* (2013.01); *H04W 80/04* (2013.01)
USPC ........................................ 370/331

(58) Field of Classification Search
CPC ................................ H04W 36/00; H04W 8/06
USPC ................................................... 370/331
See application file for complete search history.

(56) References Cited

U.S. PATENT DOCUMENTS

2007/0254661 A1* 11/2007 Chowdhury et al. ......... 455/436
2009/0274117 A1* 11/2009 Vachhani et al. ............. 370/331
(Continued)

FOREIGN PATENT DOCUMENTS

WO  WO 2008/069630 A1  6/2008
WO  WO 2009/117126 A2  9/2009

OTHER PUBLICATIONS

NetLMM Working Group, Transient Binding for Proxy Mobile IPv6 draft-liebsch-netlmm-transient-bce-pmipv6-01.txt, Jul. 14, 2008.*

(Continued)

*Primary Examiner* — Brandon Renner
*Assistant Examiner* — Faisal Choudhury
(74) *Attorney, Agent, or Firm* — Fay Sharpe LLP

(57) ABSTRACT

A method for handover of a mobile node (MN) in a communications network from a previous point of attachment (p-PoA) associated with a previous mobility access gateway (pMAG) to a new point of attachment (n-PoA) associated with a new mobility access gateway (nMAG), where the pMAG and nMAG are associated with a mobility anchor (LMA), comprises the nMAG receiving a handover indicator concerning the MN from the pMAG. After receiving the handover indicator at the nMAG, the nMAG establishes a transient binding with the LMA. Following establishment of the transient binding, the nMAG receives downloaded data for the MN from the LMA prior to establishment of a connection between the MN and the n-PoA. The method may be used with PMIP Mobile Internet Protocol (PMIP).

18 Claims, 2 Drawing Sheets

(56) References Cited

U.S. PATENT DOCUMENTS

| | | | |
|---|---|---|---|
| 2010/0027508 A1* | 2/2010 | Jee et al. | 370/331 |
| 2010/0105315 A1* | 4/2010 | Albrett | 455/3.04 |
| 2010/0272062 A1* | 10/2010 | Velev et al. | 370/331 |
| 2010/0296481 A1* | 11/2010 | Weniger et al. | 370/331 |
| 2011/0007711 A1* | 1/2011 | Muhanna et al. | 370/331 |
| 2011/0149839 A1* | 6/2011 | Toyokawa et al. | 370/328 |
| 2013/0225163 A1* | 8/2013 | Bachmann et al. | 455/433 |

OTHER PUBLICATIONS

NetLMM Working Group, Fast Handovers for PMIPv6 draft-yokota-mipshop-pfmipv6-03.txt, Jul. 14, 2008.*

M. Liebsch et al., "Transient Binding for Proxy Mobile IPv6 draft-liebsch-netlmm-transient-bce-pmipv6.01.txt," Internet Engineering Task Force, IETF, XP015059434, pp. 1-33, Jul. 14, 2008.

H. Yokota et al., "Fast Handovers for Proxy Mobile IPv6 draft-ietf-mipshop-pfmipv6-01.txt," Internet Engineering Task Force, IETF, XP015061062, pp. 1-29, Dec. 19, 2008.

Nec et al., "Correction of PMIP-based Handover Behaviour," $3^{rd}$ Generation Partnership Project (3GPP), 3GPP TSG-SA2 Meeting #67, S2-085789, Sophia Antipolis, France, XP050267800, 16 pages, Aug. 25-29, 2008.

International Search Report for PCT/EP2010/000057 dated May 26, 2010.

* cited by examiner

METHOD FOR HANDOVER OF A MOBILE NODE IN A COMMUNICATIONS NETWORK

FIELD OF THE INVENTION

The present invention relates to a method for handover of a mobile node (MN) in a communications network from a previous point of attachment (p-PoA) associated with a previous mobility access gateway (pMAG) to a new point of attachment (n-PoA) associated with a new mobility access gateway (nMAG). It is particularly, but not exclusively, related to a Proxy Mobile Internet Protocol (PMIP) implemented method.

BACKGROUND

Mobile IP (MIP) is a communications protocol being developed by the Internet Engineering Task Force (IETF) to enable a mobile node (MN) to roam between different networks. The protocol allows an MN to keep a permanent home address as it moves between domains so that it is able to receive data intended for it even when it is connected to a foreign network.

To achieve IP mobility without requiring significant involvement of the mobile node, the IETF working group netlmm has developed the Proxy MIP (PMIP) protocol (see RFC 5213—Proxy Mobile IPv6), which is a variant of MIP. In PMIP, a Mobility Access Gateway (MAG) is introduced which performs mobility related signaling on behalf of the MN. The MAG communicates with a Local Mobility Anchor (LMA) and with the Point of Attachment (PoA) of the MN. During a handover procedure to transfer the MN from a previous PoA or previous access router (PAR) to a new PoA or new access router (PAR), service interruption involving handover latency and packet loss may occur. As the PMIP base standard has been designed to require minimized involvement of the MN in the mobility signaling during IP handover, it does not address reducing the handover latency and packet loss that occurs because of address configuration and tunnel set-up.

Handover latency reducing mechanisms are known for client based IP mobility protocols, for example, as specified in Fast MIP (FMIP) (RFC 5268—Mobile IPv6 Fast Handovers) where there is a preparation phase and a bidirectional tunnel between the points of attachment. By these means, an MN with a single interface can expedite handover by establishing a bidirectional tunnel before the MN has established the new link and thus before it can update its binding with the Home Agent (HA). There have been some proposals for adapting the FMIP signalling schemes for use with PMIP handover, see, for example, IETF paper draft-ietf-mipshop-pfmipv6-01.txt (and previous proposals draft-yokota-mipshop-pfmipv6-02.txt; draft-xia-netlmm-fmip-nmagno-00.txt; and draft-han-netlmm-fast-pmipv6-00.txt) but the currently published approaches for adopting FMIP strategies for PMIP do not take into account the particular benefits of PMIP, but simply re-use FMIP. In FMIP, the binding update is done by the MN and thus can only be performed after attachment of the MN to the new PoA, with a binding update procedure to the home agent occurring at the end of the sequence.

In another proposal for improving handover performance in PMIP, transient bindings have been proposed to utilize two simultaneous bindings during the handover. See, for example, IETF paper draft-ietf-mipshop-transient-bce-pmipv6-00.txt (and also 3GPP SAE docs S2-082538, S2-083690, S2-084957 and earlier IETF papers: draft-blume-netlmm-secondary-binding-proxymip6ho-00.txt, draft-liebsch-netlmm-transient-bce-pmipv6-00.txt and draft-muhanna-nefimm-pmipv6-support-transient-coa-01.txt). Transient bindings allow for pre-establishment of a binding to a new MAG while the MN is still attached to the previous PoA and previous MAG.

BRIEF SUMMARY

According to the invention, a method for handover of a mobile node (MN) in a communications network from a previous point of attachment (p-PoA) associated with a previous mobility access gateway (pMAG) to a new point of attachment (n-PoA) associated with a new mobility access gateway (nMAG), where the pMAG and nMAG are associated with a mobility anchor (LMA), comprises the nMAG receiving a handover indicator concerning the MN from the pMAG. After receiving the handover indicator at the nMAG, the nMAG establishes a transient binding with the LMA. Following establishment of the transient binding, the nMAG receives downloaded data for the MN from the LMA prior to establishment of a connection between the MN and the n-PoA.

One method in accordance with the invention is implemented with Proxy Mobile Internet Protocol (PMIP). When the MN is not yet attached to nMAG, a normal proxy binding update (PBU) cannot be done for PMIP, as PMIP requires the nMAG to be assured that the MN is attached. However, transient bindings can be used to resolve this security issue. In one embodiment, an early transient binding is used and is automatically activated by the LMA after a given timer period, as set out in draft-ietf-mipshop-transient-bce-pmipv6-00.txt.

In a more secure embodiment, a new type of early transient binding is proposed, which may use a new FAST flag in the transient binding update message. The early transient binding is arranged to be automatically deleted by the LMA if the fast handover fails, for example, if the transient binding is not activated by the n-MAG within a given timer period.

Where early transient binding is used, the nMAG can thus perform a transient binding update to the LMA during the preparation phase of the handover, triggered by a Handover Indication from pMAG. In some embodiments of the invention, the Handover Indication may be an adaption of the HI-message of the FMIP protocol.

In a method in accordance with the invention, after the MN has established connectivity with n-PoA, the transient binding is activated into a normal binding. By activating the transient binding after establishment of the new connectivity, there is no further change of the data path. Thus, the typical jitter and latency of an FMIP scheme is avoided or reduced while allowing principles of FMIP to be used. In one embodiment, the nMAG activates the transient binding into a normal binding on receipt of an indicator indicating establishment of connection between MN and n-PoA. This confirms that the MN now is attached to the nMAG, as required by PMIP. In another embodiment, the LMA activates the transient binding into a normal binding after a timer period.

In a method in accordance with the invention, a transient binding permits an early updating of the mobility anchor (LMA). A bidirectional tunnel between pMAG and nMAG is not required for forwarding of data to nMAG; only control plane signaling between pMAG and nMAG need be used. Thus it avoids unnecessary overheads and routing of packets between LMA, pMAG and nMAG, and reduces potential packet loss. This is especially advantageous in a partly meshed network topology as used in PMIP domains.

In the event that the transient binding has not been established before the link between the MN and pMAG breaks (reactive mode) the LMA may send some data packets to the pMAG that cannot be delivered. This may be accounted for with a binding revocation of the LMA to the pMAG when it receives a new PBU for this MN from an nMAG. The pMAG then returns the buffered data to the LMA and LMA reroutes them to the nMAG according to the new proxy binding This method avoids packet loss at the pMAG but these packets may be delayed due to the round trip time between nMAG and pMAG.

BRIEF DESCRIPTION OF THE DRAWINGS

Some embodiments of the present invention will now be described by way of example only, and with reference to the accompanying drawings, in which.

DETAILED DESCRIPTION

In PMIP, the network performs the proxy binding of the Care-of-Address (CoA) at the mobility anchor (LMA, home agent). Thus, there is no necessity to wait for the link-up of the MN at its new Access Router (AR) to perform the Proxy Binding at the LMA. Instead, already when the pMAG takes a predictive HO decision, the network triggers forwarding of downlink packets to the nMAG, that is, pMAG requests nMAG to update the binding cache at LMA. Furthermore, this avoids the interruption or reordering that FMIP suffers from when releasing the bidirectional tunnel. The invention may be implemented with a simple signaling scheme for predictive handover in a PMIP domain that reduces tunneling overhead and handover latency.

Figure 1:
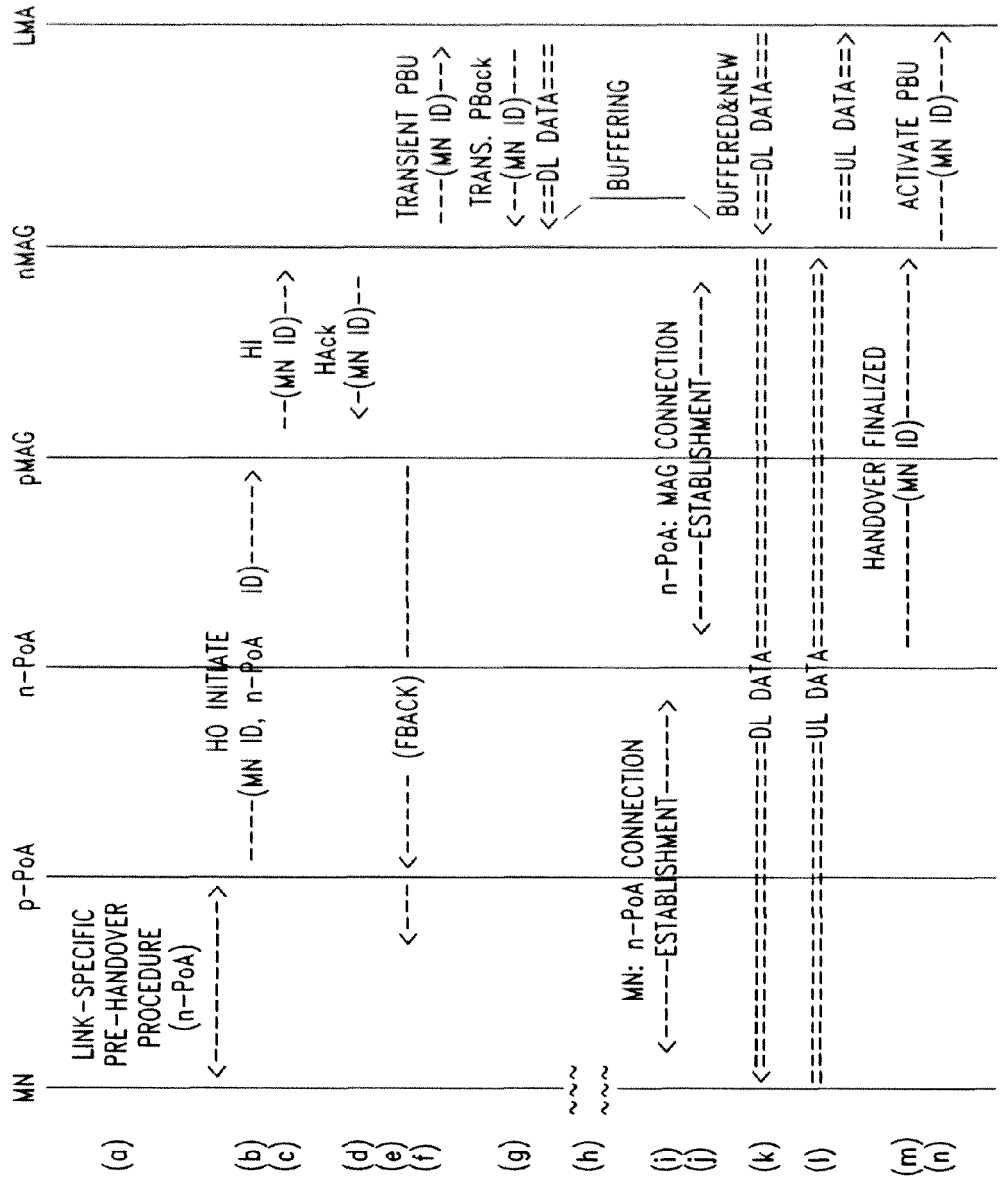
FIG. 1 schematically illustrates a method in accordance with the invention.

With reference to FIG. 1, steps (a) to (n) are shown for a signaling protocol used in a handover of a mobile node (MN) and complying with PMIP. The entities involved are a p-PoA associated with a pMAG, an n-PoA associated with an nMAG, and an LMA.

(a) At step (a), handover is imminent and a link-specific pre-handover procedure is performed. This may include measurements of the MN to detect the availability of a n-PoA. The pre-handover procedure may be host-initiated or network-initiated.

(b) The p-PoA, to which the MN is currently attached, indicates to the pMAG that handover of the MN is required. The message includes an MN identifier (for example, Network Access Identifier (NM, RFC-4282), MAC address or other Link Layer address) and the identity of the n-PoA.

(c) The pMAG sends a Handover Initiate message (HI) to the address of the nMAG, which is resolved by the n-PoA ID. The HI message includes the MN identification MN ID and optionally further context information, e.g. the LMA address or the MN's PMIP Home Network Prefix.

(d) The nMAG sends the Handover Acknowledgment HAck to the pMAG.

(e) The pMAG informs p-PoA of the successful HAck. p-PoA may use a link-specific indication to the MN to trigger change of its attachment now.

(f) The nMAG establishes a transient binding with early switching of the download path DL for the MN with the MN-ID. A normal proxy binding update PBU cannot be done for PMIP as PMIP requires the nMAG to be assured that the MN is attached. However, the transient binding resolves this security issue.

(g) The LMA sends a Proxy Binding acknowledgement PBAck to the nMAG. The LMA starts forwarding of DL data to the nMAG.

(h) nMAG starts to buffer the packets.

(i) The MN hands over to the New Access Network and establishes a connection (e.g. radio channel) with the n-PoA.

(j) The attachment in turn triggers the establishment of a connection for the MN between the n-PoA and nMAG. This step may be expedited by the use of the context information received in step (c).

(k) Due to the pre-established transient binding, the nMAG can immediately start to transfer buffered and new packets destined for the MN via the n-PoA.

(l) The uplink packets from the MN are sent to the nMAG via the n-PoA and the nMAG forwards them to the LMA using the pre-established transient binding for the MN.

(m) n-PoA indicates that the handover of the MN is finalised.

(n) The nMAG activates the transient binding into a normal PMIP binding. This does not create any delay or jitter in the data path. The activation is due within a timer period to confirm that the MN now is attached to the NMAG, as required by PMIP.

In another embodiment, step (c) only prepares nMAG and, after sending the HAck, nMAG awaits a further trigger from pMAG to determine when to send a transient binding update with the MN ID to the LMA.

Figure 2:
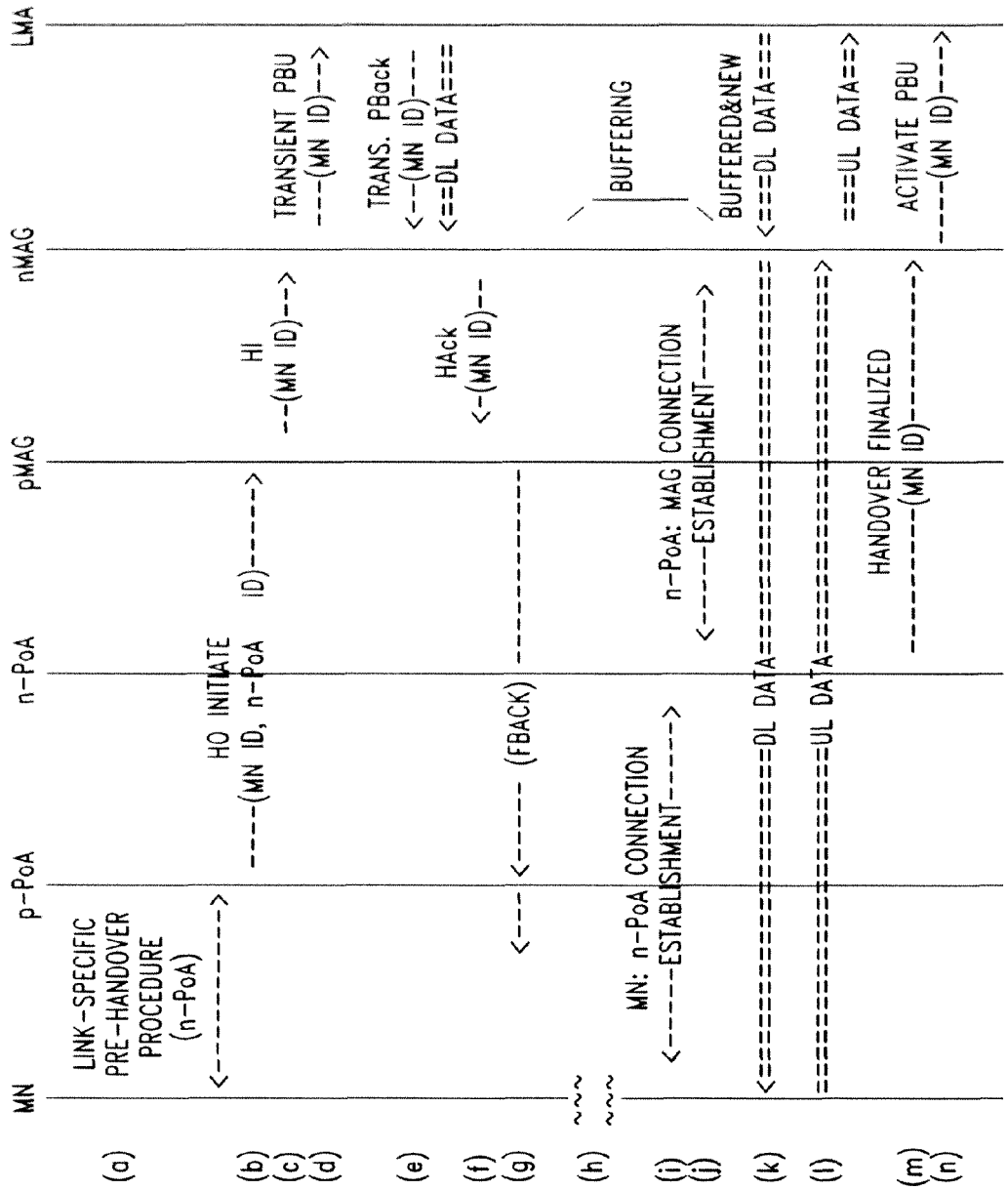
FIG. 2 schematically illustrates another method in accordance with the invention

With reference to FIG. 2, in another embodiment, instead of the HAck being sent at step (d), the nMAG first performs the signalling with the LMA for the transient binding, i.e. the HAck is delayed until nMAG has received the PBAck from LMA in step (e). This reduces the amount of packets still sent from LMA to pMAG and thus the risk of loss of packets on-the-fly when the p-PoA triggers the MN to change the PoA in step (g).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for handover of a mobile node (MN) in a communications network, comprising:

receiving a handover indicator concerning a mobile node (MN) from a previous mobility access gateway (pMAG) at a new MAG (nMAG), wherein the handover indicator relates to a handover of the MN from a previous point of attachment (p-PoA) associated with the pMAG to a new PoA (n-PoA) associated with the nMAG, wherein the pMAG and nMAG are associated with a local mobility anchor (LMA);

establishing a transient binding between the nMAG and the LMA; and receiving download data for the MN in a download path from the LMA at the nMAG prior to establishment of a connection between the MN and the n-PoA;

wherein the LMA is configured to automatically remove the transient binding with the nMAG, unless the nMAG confirms a successful handover to the n-PoA by activating the transient binding into a normal binding within a timer period after receipt of a trigger from the n-PoA at the nMAG indicating a connection between the MN and the n-PoA has been established;

the method further comprising:

signalling the pMAG from the LMA that the MN has moved to the nMAG and the normal binding at the LMA has been updated to the nMAG; and receiving at least one data packet from the pMAG at the LMA in conjunction with a handover failure mode, wherein the at least one data packet is destined for the MN, was buffered at the pMAG, and can no longer be transmitted from the pMAG to the MN, wherein the at least one data packet is transmitted from the LMA to the nMAG using the normal binding at the LMA after the at least one data packet is received from the pMAG.

2. The method as claimed in claim 1, further comprising: after the MN has established the connection with the n-PoA, activating the transient binding between the nMAG and the LMA into a normal binding.

3. The method as claimed in claim 2 wherein the transient binding between the nMAG and the LMA is activated into a normal binding within a timer period.

4. The method as claimed in claim 2, wherein the transient binding between the nMAG and the LMA is activated into a normal binding after receipt of a trigger from the n-PoA at the nMAG indicating the connection between the MN and the n-PoA was established.

5. The method as claimed in claim 1 wherein the transient binding between the nMAG and the LMA is established after receipt of a synchronisation trigger at the nMAG from the pMAG, the synchronisation trigger being received after receipt of the handover indicator by the nMAG.

6. The method as claimed in claim 1 wherein the handover indicator includes MN context information.

7. The method as claimed in claim 1 wherein the method is implemented in a Proxy Mobile Internet Protocol (PMIP) domain.

8. An apparatus in a communications network, comprising:

a new mobility access gateway (nMAG) configured to receive a handover indicator concerning a mobile node (MN) from a previous mobility access gateway (pMAG), wherein the handover indicator relates to a handover of the MN from a previous point of attachment (p-PoA) associated with the pMAG to a new PoA (n-PoA) associated with the nMAG, wherein the pMAG and nMAG are associated with a local mobility anchor (LMA);

wherein the nMAG is configured to establish a transient binding with the LMA;

wherein the nMAG is configured to receive download data for the MN in a download path from the LMA prior to establishment of a connection between the MN and the n-PoA;

wherein the LMA is configured to automatically remove the transient binding with the nMAG, unless the nMAG confirms a successful handover to the n-PoA by activating the transient binding into a normal binding within a timer period after receipt of a trigger from the n-PoA at the nMAG indicating a connection between the MN and the n-PoA has been established;

wherein the LMA is configured to signal the pMAG that the MN has moved to the nMAG and the normal binding at the LMA has been updated to the nMAG;

wherein the LMA is configured to receive at least one data packet from the pMAG in conjunction with a handover failure mode, wherein the at least one data packet is destined for the MN, was buffered at the pMAG, and can no longer be transmitted from the pMAG to the MN, wherein the LMA is configured to transmit the at least one data packet to the nMAG using the normal binding at the LMA after the at least one data packet is received from the pMAG.

9. The apparatus as claimed in claim 8 wherein the nMAG is configured to activate the transient binding with the LMA into a normal binding after the MN has established the connection with the n-PoA.

10. The apparatus as claimed in claim 9 wherein the nMAG is configured to activate the transient binding with the LMA into a normal binding within a timer period.

11. The apparatus as claimed in claim 9 wherein the nMAG is configured to activate the transient binding with the LMA into a normal binding after receipt of a trigger from the n-PoA indicating the connection between the MN and the n-PoA was established.

12. The apparatus as claimed in claim 8 wherein the nMAG is configured to establish the transient binding with the LMA after receipt of a synchronisation trigger from the pMAG, the synchronisation trigger being received after receipt of the handover indicator by the nMAG.

13. The apparatus as claimed in claim 8 wherein the handover indicator includes MN context information.

14. The apparatus as claimed in claim 8 wherein the apparatus is implemented in a Proxy Mobile Internet Protocol (PMIP) domain.

15. An apparatus in a communications network, comprising:

a local mobility anchor (LMA) configured to implement a transient binding with a new mobility access gateway (nMAG) in conjunction with the nMAG receiving a handover indicator concerning a mobile node (MN) from a previous mobility access gateway (pMAG), wherein the handover indicator relates to a handover of the MN from a previous point of attachment (p-PoA) associated with the pMAG to a new PoA (n-PoA) associated with the nMAG, wherein the pMAG and nMAG are associated with the (LMA);

wherein the nMAG is configured to establish the transient binding with the LMA;

wherein the LMA is configured to send download data for the MN in a download path to the nMAG prior to establishment of a connection between the MN and the n-PoA;

wherein the LMA is configured to automatically remove the transient binding with the nMAG, unless the nMAG confirms a successful handover to the n-PoA by activating the transient binding into a normal binding within a timer period after receipt of a trigger from the n-PoA at the nMAG indicating a connection between the MN and the n-PoA has been established;

wherein the LMA is configured to signal the pMAG that the MN has moved to the nMAG and the normal binding at the LMA has been updated to the nMAG;

wherein the LMA is configured to receive at least one data packet from the pMAG in conjunction with a handover failure mode, wherein the at least one data packet is destined for the MN, was buffered at the pMAG, and can no longer be transmitted from the pMAG to the MN, wherein the LMA is configured to transmit the at least one data packet to the nMAG using the normal binding at the LMA after the at least one data packet is received from the pMAG.

16. The apparatus as claimed in claim 15 wherein the transient binding between the nMAG and the LMA is activated into a normal binding after the MN has established the connection with the n-PoA.

17. The apparatus as claimed in claim 15 wherein the transient binding between the nMAG and the LMA is established after receipt of a synchronisation trigger from the pMAG at the nMAG, the synchronisation trigger being received after receipt of the handover indicator by the nMAG.

18. The apparatus as claimed in claim 15 wherein the apparatus is implemented in a Proxy Mobile Internet Protocol (PMIP) domain.

* * * * *